United States Patent
Pellicano et al.

(12)

(10) Patent No.: US 9,608,414 B2
(45) Date of Patent: Mar. 28, 2017

(54) RACK POSITIONING ASSEMBLY FOR AN ELECTRIC PANEL, ELECTRIC PANEL COMPRISING ONE SUCH ASSEMBLY AND METHOD FOR FITTING THIS ASSEMBLY

(71) Applicant: Schneider Electric Industries SAS, Rueil-Malmaison (FR)

(72) Inventors: Joseph Pellicano, St Alban Leysse (FR); Pierre Carle, Saint Pierre d'Albigny (FR); Philippe Blochouse, La Motte Servolex (FR)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 0 days.

(21) Appl. No.: 14/670,882

(22) Filed: Mar. 27, 2015

(65) Prior Publication Data
US 2015/0295390 A1  Oct. 15, 2015

(30) Foreign Application Priority Data
Apr. 11, 2014  (FR) .................... 14 53275

(51) Int. Cl.
*H02B 1/21*  (2006.01)
*H02B 1/36*  (2006.01)
(Continued)

(52) U.S. Cl.
CPC ........... *H02B 1/21* (2013.01); *H02B 1/36* (2013.01); *H02B 11/04* (2013.01); *H02G 5/068* (2013.01)

(58) Field of Classification Search
CPC . H02B 1/21; H02B 1/26; H02B 11/04; H02B 11/12; H02B 11/173; H02G 5/00–5/10
(Continued)

(56) References Cited

U.S. PATENT DOCUMENTS 3,113,820 A * 12/1963 Norden .................... H02B 1/21
                                                              174/68.2
3,469,149 A *  9/1969 Paape ...................... H02B 1/21
                                                              174/100

(Continued)

FOREIGN PATENT DOCUMENTS

DE            40 15 040 A1   11/1990
DE       102008046881 A1 *    3/2010   ............. H02B 1/21

OTHER PUBLICATIONS

French Preliminary Search Report issued Nov. 26, 2014 in French Application 14 53275, filed Apr. 11, 2014 ( with English Translation of Categories of Cited Documents).

*Primary Examiner* — Zachary M Pape
(74) *Attorney, Agent, or Firm* — Oblon, McClelland, Maier & Neustadt, L.L.P.

(57) ABSTRACT

The inventive rack positioning assembly for an electric panel comprises a vertical busbar (J2) for distributing electric current to electric appliances, said busbar comprising several bars, which are positioned in a same vertical plane and on which it is provided to connect racks of the electric panel, and several rack positioning modules (20), which are positioned above one another and which surround the bars of the vertical busbar. The positioning modules (20) comprise means (50) for increasing the insulation distance between the bars at the interface between two successive modules, that insulation distance corresponding to the length of the electric creep path between the bars.

12 Claims, 8 Drawing Sheets

Figure 1:
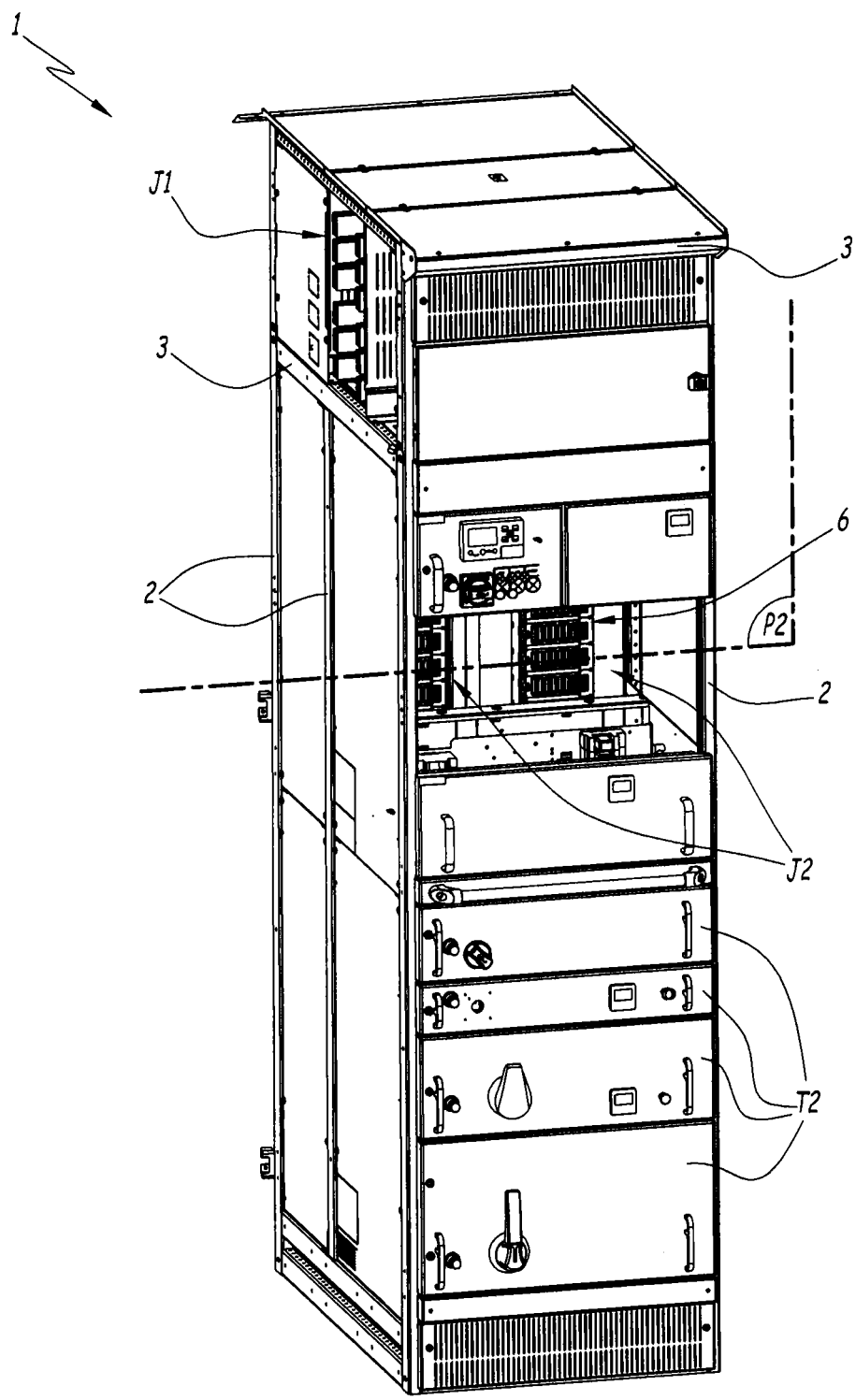

(51) Int. Cl.
*H02G 5/06* (2006.01)
*H02B 11/04* (2006.01)

(58) Field of Classification Search
USPC .................. 361/611, 612, 624, 637, 640
See application file for complete search history.

(56) References Cited

U.S. PATENT DOCUMENTS

| | | | | |
|---|---|---|---|---|
| 4,781,608 A | * | 11/1988 | Hillmann | B60M 1/34 |
| | | | | 211/94.01 |
| 6,781,818 B2 | * | 8/2004 | Josten | H02B 1/21 |
| | | | | 174/149 B |
| 2015/0244122 A1 | * | 8/2015 | Greenwood | H01R 13/46 |
| | | | | 439/110 |

* cited by examiner

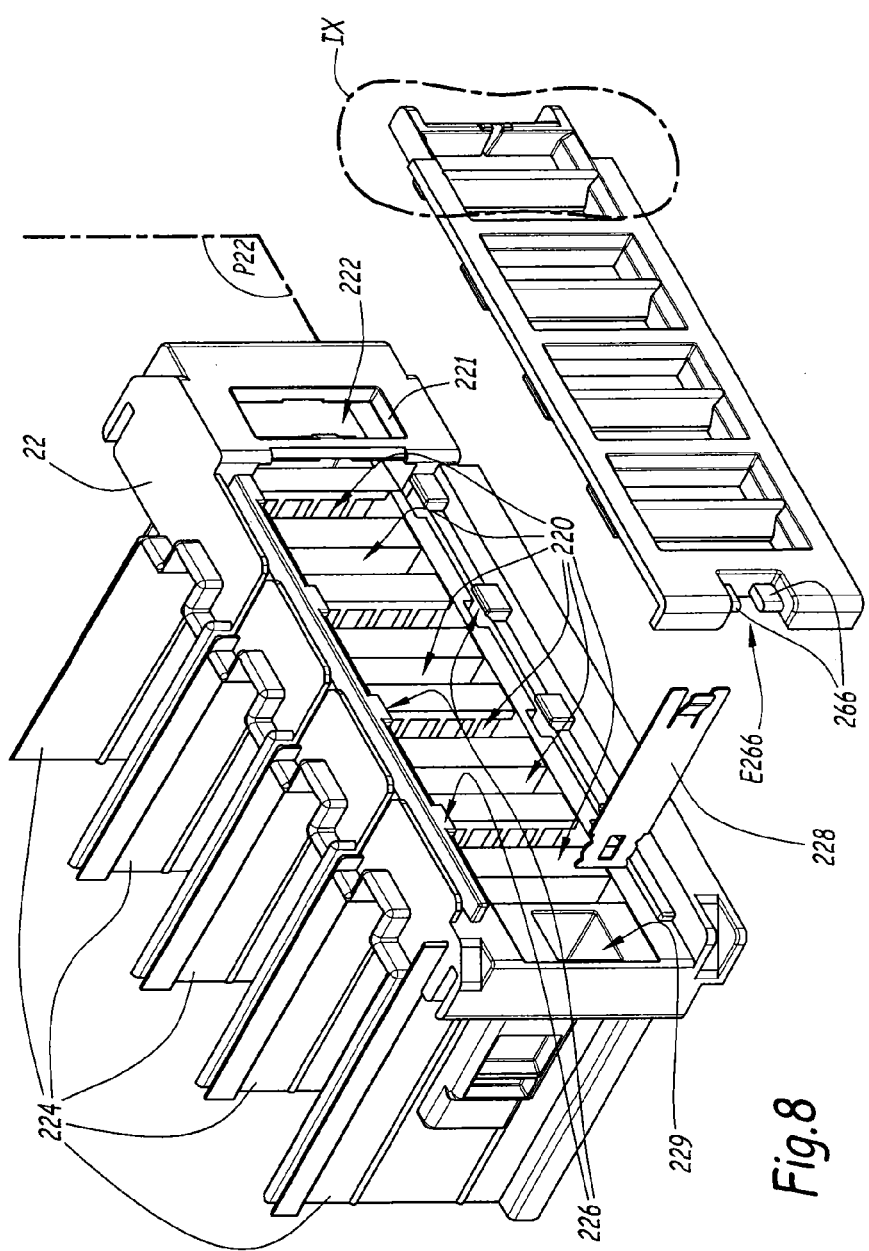
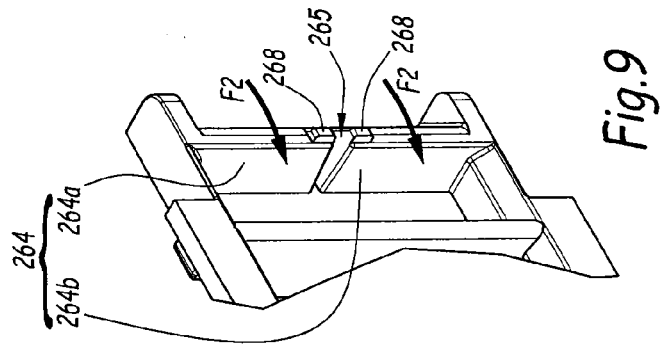
Fig.8
Fig.9

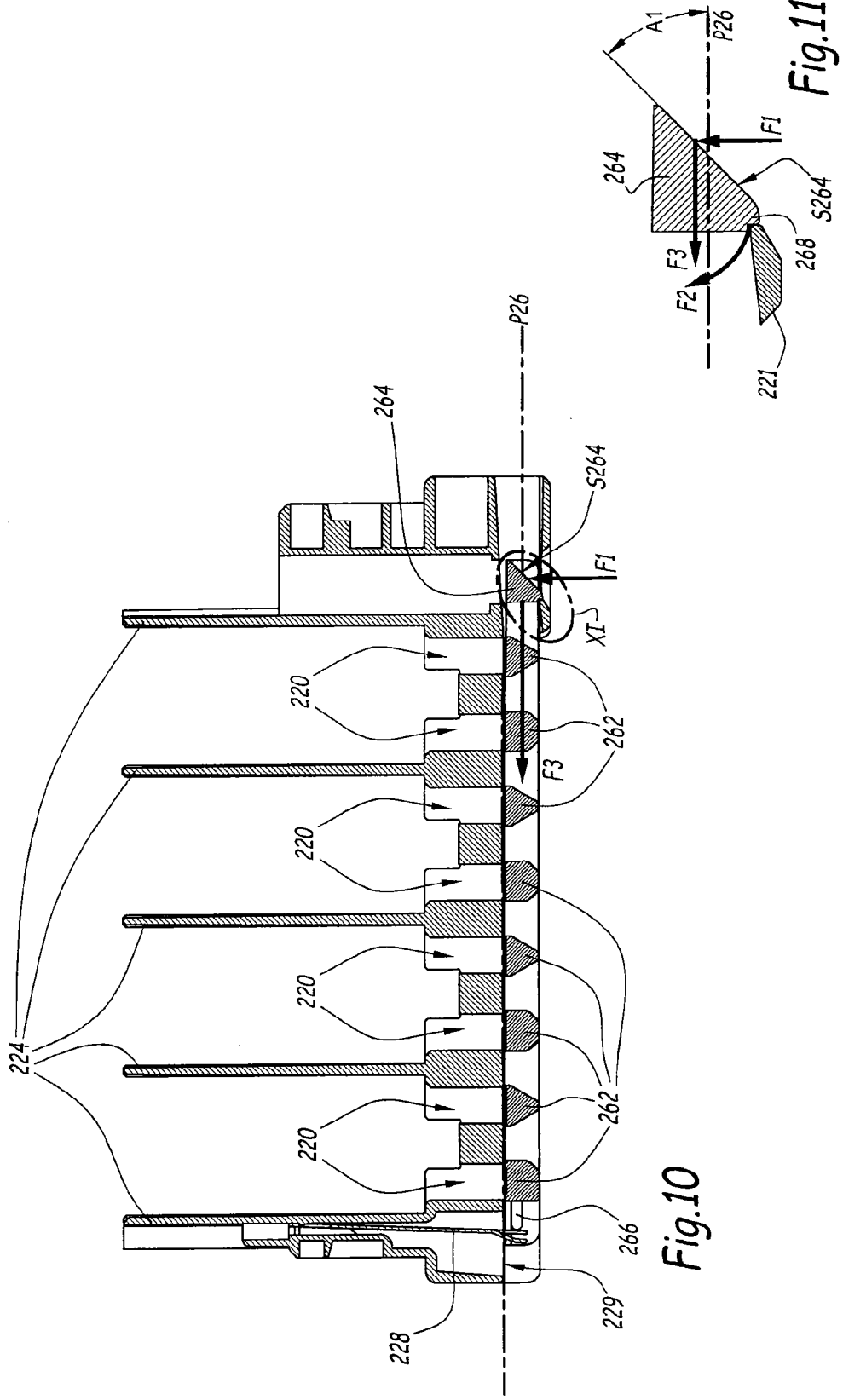

RACK POSITIONING ASSEMBLY FOR AN ELECTRIC PANEL, ELECTRIC PANEL COMPRISING ONE SUCH ASSEMBLY AND METHOD FOR FITTING THIS ASSEMBLY

The invention relates to a rack positioning or plugging assembly for an electric panel, to an electric panel comprising such an assembly and to a method for fitting that assembly.

The invention applies to low-voltage electric panels, which are provided with pluggable racks.

In a known manner and as described in EP-A-1,043,820, a low-voltage electric panel comprises a cabinet, inside which a horizontal busbar for supplying electric current is positioned, generally in the upper portion. This horizontal busbar is connected with a vertical busbar for distributing electric current to different electric appliances. The electric appliances are selectively connected to the electric panel using detachable racks, which act as a disconnecting switch. This is referred to as a detachable rack panel. The vertical busbar comprises several bars positioned in a same vertical plane.

Electric panels with detachable racks are particularly suitable for electric facilities comprising many electric appliances. Each rack comprises all of the electric members necessary for the operation of an appliance, for example a circuit breaker, a contactor or a thermal relay. Each rack further comprises means for connecting to the bars of the vertical busbar, such as clamps, and an output terminal on which power cables of the electric appliance associated with the rack are connected.

Using detachable racks makes it possible to replace the defective rack easily in case of breakdown.

The racks are each positioned, or attached, on a positioning assembly provided to that end, which is housed in the cabinet of the electric panel. This positioning assembly comprises several modules, each module offering the possibility of attaching a rack. Generally, the modules are positioned above one another, and serve for mechanical attachment of the racks, electrical insulation for the vertical busbar relative to the outside, and electrical installation of the bars of the vertical busbar with respect to one another. However, between two pluggable modules of a rack, the bars of the vertical busbar are directly across from one another due to the empty space between two successive positioning modules. Certain standards require reducing the risk of short circuit by increasing the insulation distance and the direct opposite nature between conductive elements.

DE-A-40 15 040 addresses this problem. It discloses an electric panel comprises rack positioning modules, which are stacked above one another. Each positioning module comprises a housing formed by two superimposed partitions and four separating flanks for the bars of the vertical busbar. The flanks extend on either side of the superimposed partitions and form raised lines in the upper and lower part of the housing. These raised lines increase the length of the electric creep path between two bars adjacent to the interface between two successive modules. However, the raised lines do not sufficiently increase the length of the electric creep path between two adjacent bars. Thus, the positioning modules are not suitable for the case where the bars of the vertical busbar are kept tighter together because a short circuit could occur.

The invention more particularly aims to resolve these drawbacks by proposing a rack positioning assembly for an electric panel in which length of the electric creep path between the bars of the vertical busbar, at the interface between two successive modules, is greater.

To that end, the invention relates to a rack positioning assembly for an electric panel comprising a vertical busbar for distributing electric current to electric appliances, said busbar comprising several bars, which are positioned in a same vertical plane and on which it is provided to connect racks of the electric panel, and several rack positioning modules, which are positioned above one another and which surround the bars of the vertical busbar. The positioning modules comprise means for increasing the insulation distance between the bars at the interface between two successive modules, that insulation distance corresponding to the length of the electric creep path between the bars. According to the invention, the increasing means comprise separating flanks for the bars of the vertical busbar, between which insulating ribs extend.

Owing to the invention, the creep path, or leak path, to be traveled for the current to go from one bar to another, which is a "forced" path for the current, has a greater length than for a standard positioning module. The electric insulation between the bars of the vertical busbar is thus reinforced without increasing the separation of the bars from one another.

According to advantageous but optional aspects of the invention, a rack positioning assembly for an electric panel may comprise one or more of the following features, considered in any technically acceptable combination:

- The insulating ribs are in the form of a broken line.
- The insulating distance is equal to 25.4 mm.
- Each positioning module comprises a first part, in which passage openings are arranged for electric connection means connecting a rack to the bars of the vertical busbar, a second part, positioned behind the first part, and a closing member, which is movable relative to the first part between a closed configuration in which the openings are closed off and an open configuration in which the openings are exposed.
- The closing member is a grate, which is horizontally movable relative to the first part, in a direction parallel to the vertical positioning plane of the bars of the vertical busbar and which is positioned in the foreground of the module, while the grate comprises several openings and several bars, among which an end part is suitable for being attached to the first part when the closing member is in the closed configuration.
- The end bar is detachable from the first part by applying a transverse force oriented globally perpendicular to the vertical plane in which the bars of the vertical busbar are placed, while the end bar comprises a contact surface that is inclined relative to that plane, and the force applied to detach the bar also causes a longitudinal movement of the grate relative to the first part.
- Each module comprises means for returning the closing member to the closed configuration.
- The return means comprises a flat spring attached to the first part, which exerts an elastic load force returning the closing member to its closed configuration.

The invention also relates to an electric panel, comprising a cabinet, in which a horizontal power supply busbar is positioned provided to be connected to a vertical distributor busbar. According to the invention, the panel comprises a rack positioning assembly as described above.

The invention lastly relates to a method for fitting a rack positioning assembly as previously described. That method comprises the following successive steps:

a) placing a metal enclosure with a U-shaped cross-section flat, with the two side walls of the enclosure oriented vertically and the outer surface of the bottom of the enclosure in contact with a planar surface, b) fastening the second part of a first module to the inside of the enclosure, at a first end of the enclosure, c) assembling the second parts of the other modules one after the other going from the first end to a second end, the first and second ends respectively being lower and upper ends of the enclosure in the assembled configuration of the assembly in the electric panel, d) positioning bars of the vertical busbar in housings of the second parts of the modules, e) fastening the first part of the first module to the top of the bars, and assembling the first part of the other modules one after the other going from the first end to the second end.

Figure 2:
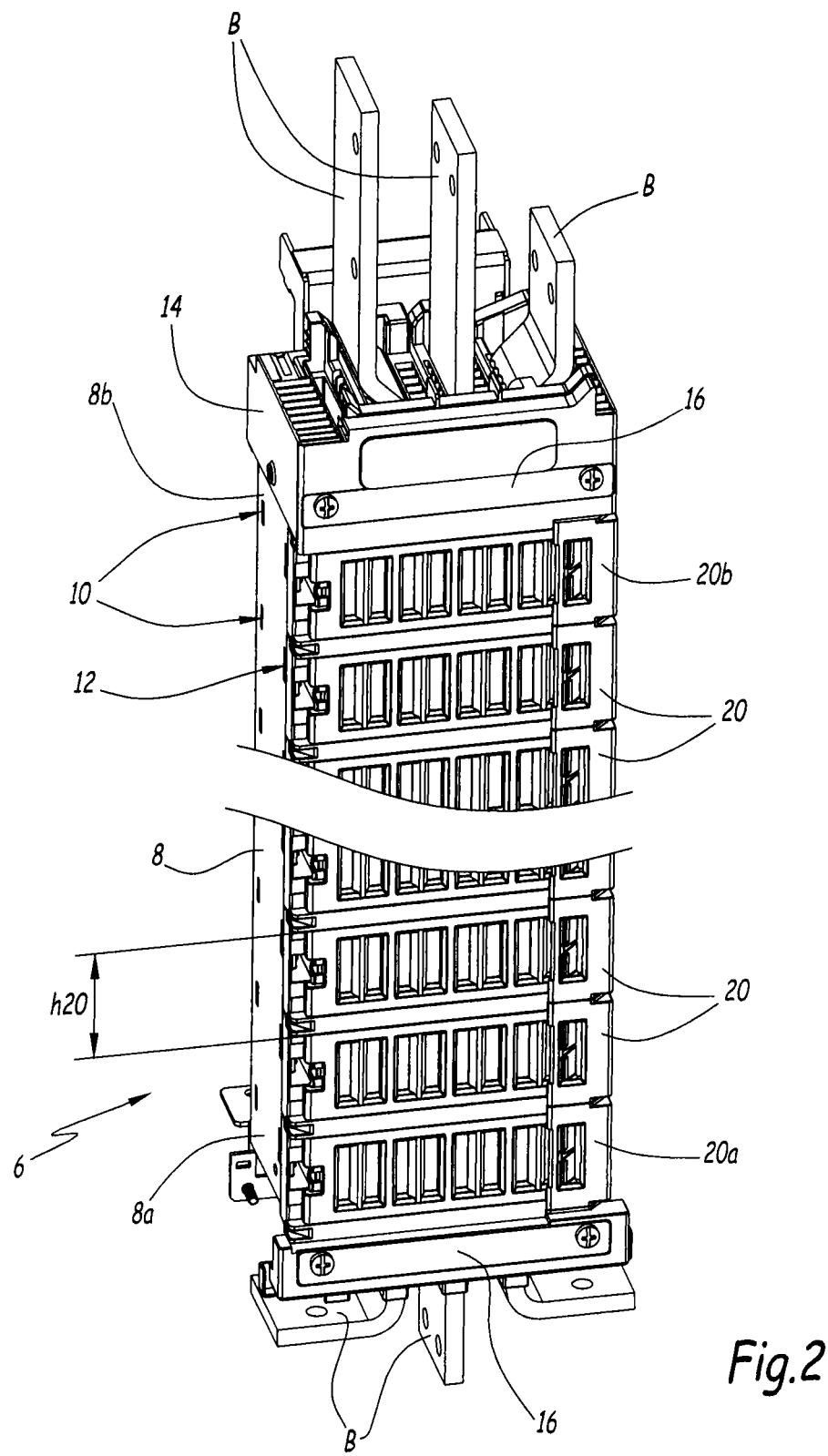
Figure 3:
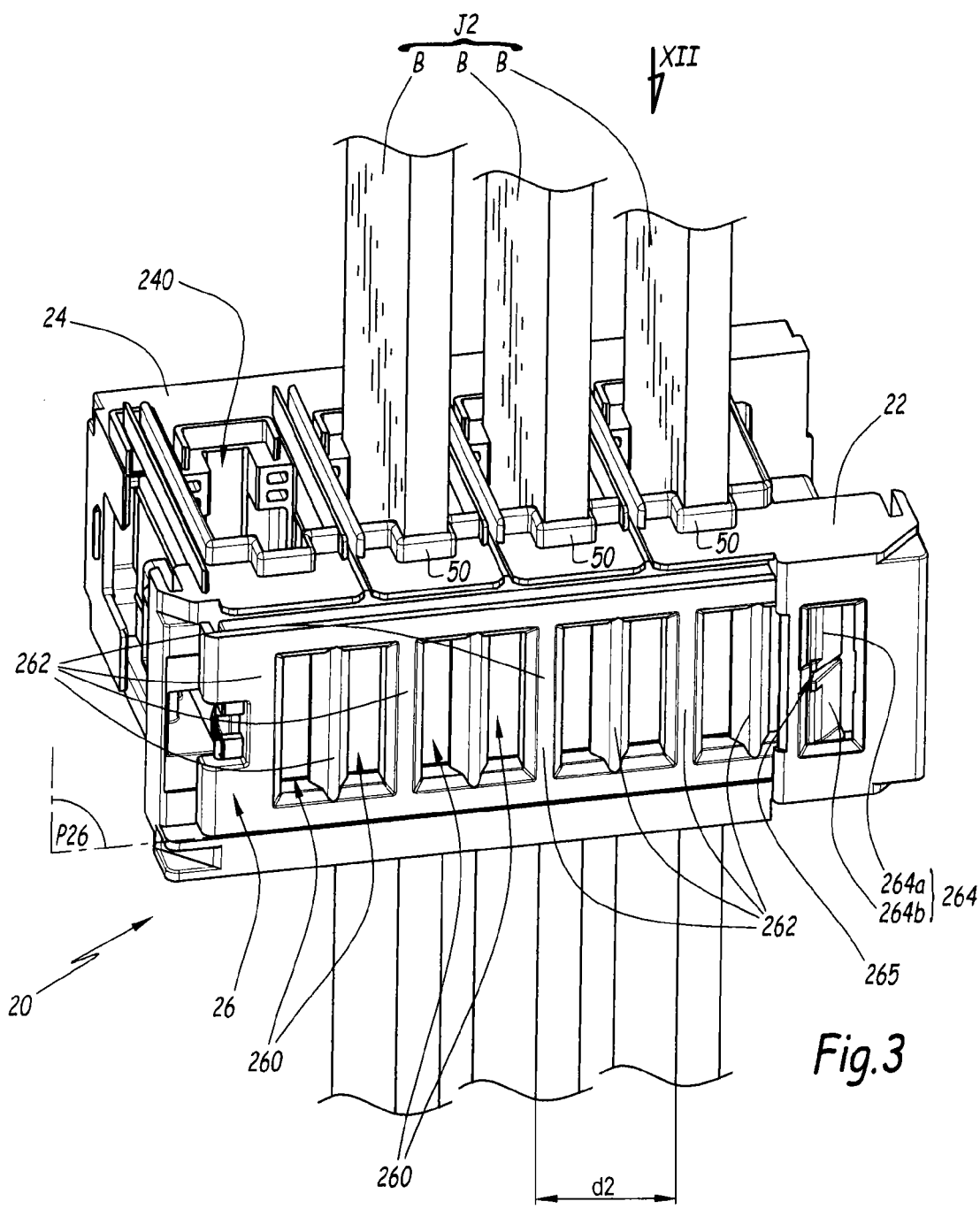
Figure 4:
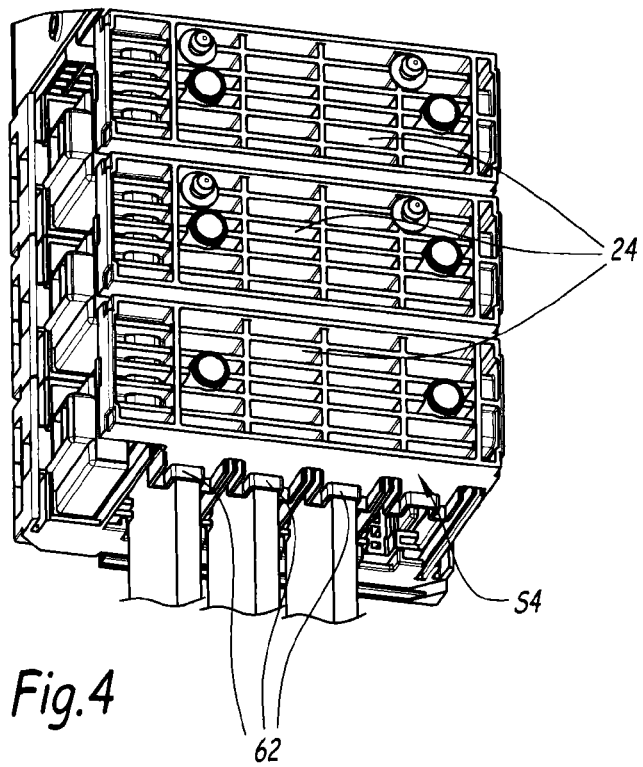
Figure 5:
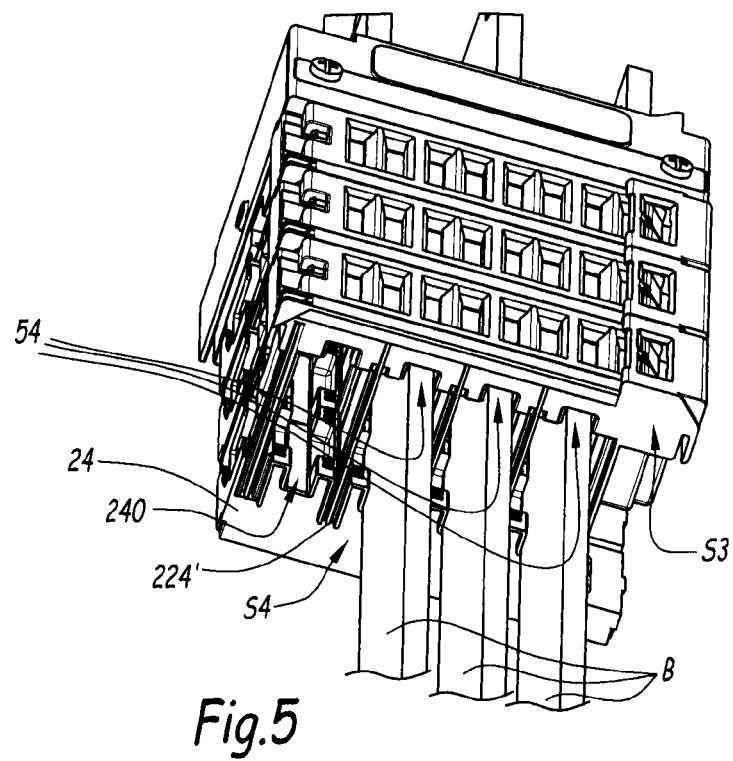
Figure 6:
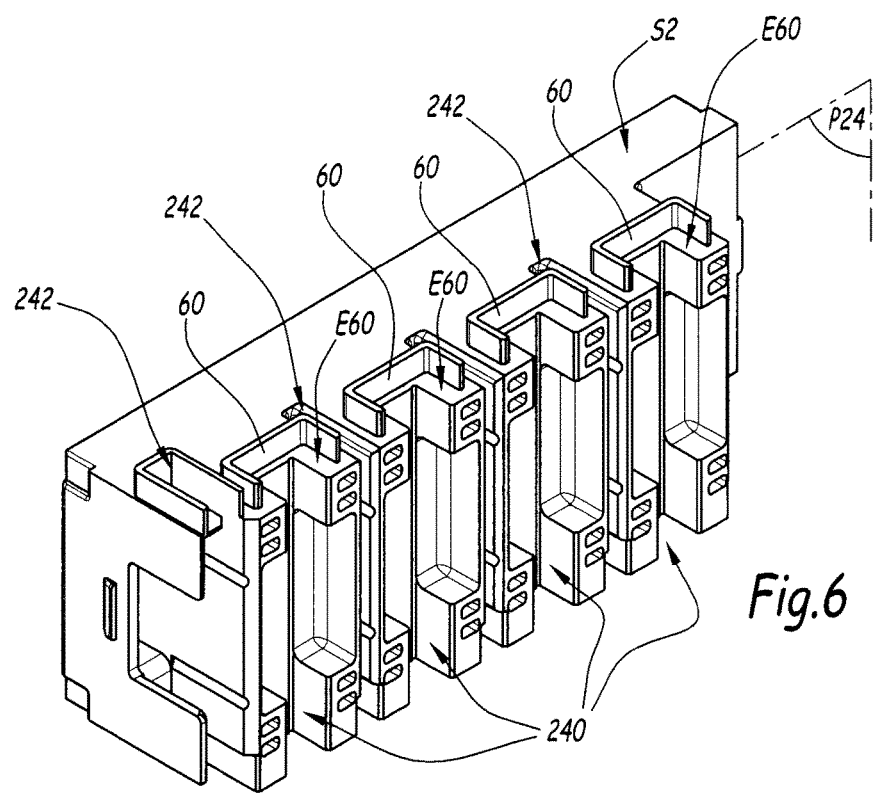
Figure 7:
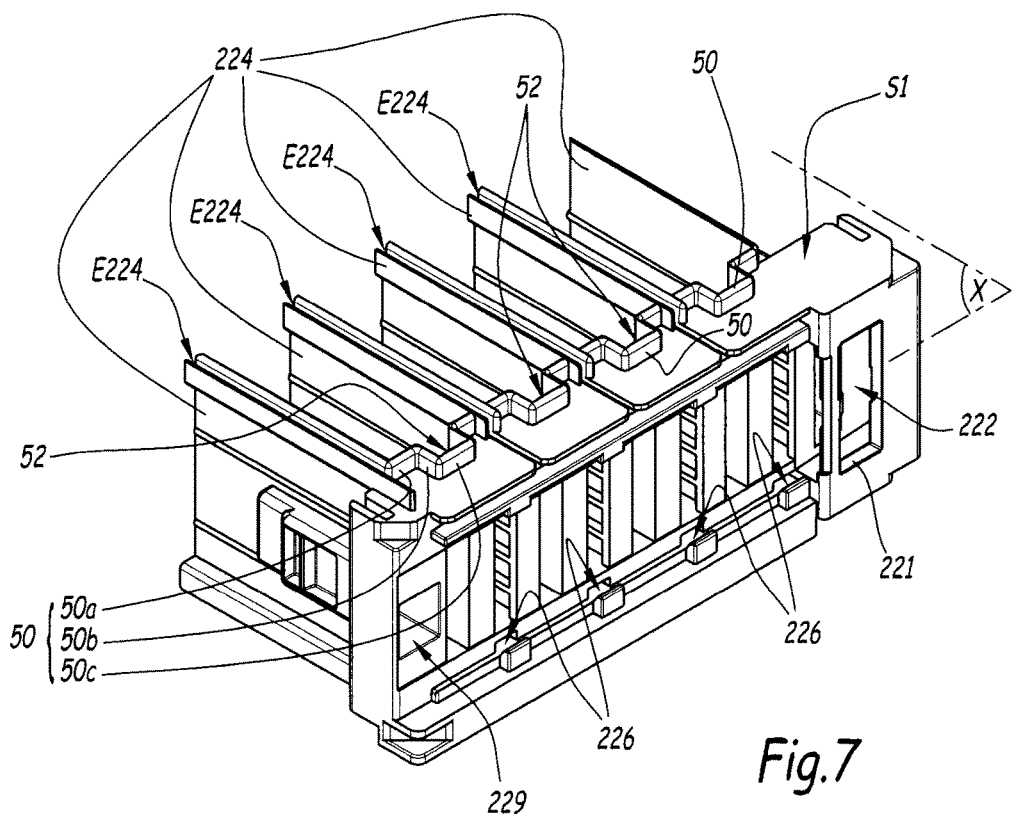
Figure 12:
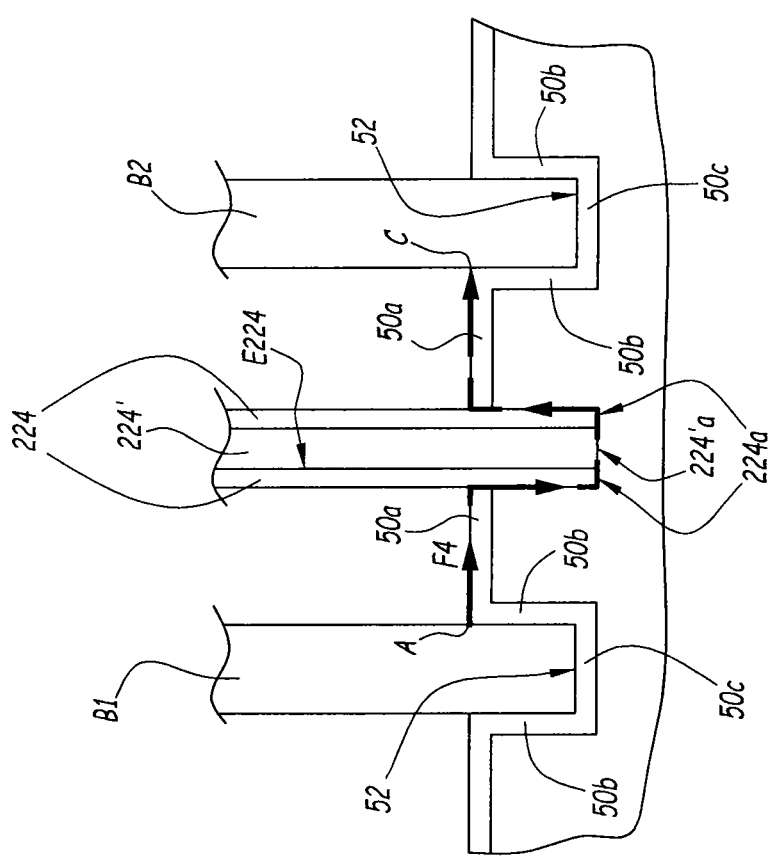

The invention and other advantages thereof will appear more clearly in light of the following description of one embodiment of a rack positioning assembly for an electric panel according to its principle and done in reference to the drawings, in which:

FIG. 1 is a perspective view of an electric panel comprising a rack positioning assembly according to the invention, FIG. 2 is an enlarged view of the positioning assembly of FIG. 1, which is partially shown in the direction of the height, FIG. 3 is an enlarged perspective view of a positioning module of a rack belonging to the positioning assembly of FIG. 2, FIG. 4 is a bottom perspective view of an assembly of three positioning modules according to FIG. 3, FIG. 5 is a view similar to FIG. 4, from another angle, FIG. 6 is a perspective view of a rear part of the positioning module of FIG. 3, FIG. 7 is a perspective view of a front part of the positioning module of FIG. 3, FIG. 8 is an exploded perspective view, illustrating the front part of FIG. 7, a flat spring and a closing member, FIG. 9 is an enlarged view of circle IX in FIG. 8, FIG. 10 is a horizontal cross-section in plane X in FIG. 7 of the front part of the positioning module, on which the closing member and the flat spring are positioned, FIG. 11 is an enlarged view of circle XI in FIG. 10, and FIG. 12 is a partial view of a module along arrow XII in FIG. 3, in which a flank of an identical module positioned above is nested.

FIG. 1 shows an electric panel, or electric cell 1. This electric panel 1 is a low-voltage panel, with an operating range that may vary from 400 A to 2000 A.

The electric panel 1 is a cabinet, the frame of which is formed by uprights 2 and crosspieces 3, which define a globally parallelepiped cage. The uprights 2 and crosspieces 3 of the panel 1 are metal bars.

In this document, the "horizontal" and "vertical" directions are interpreted relative to the configuration of FIG. 1.

A horizontal busbar J1 is installed in the upper part of the electric panel 1. This busbar J1 is an electric current supply busbar and comprises one or more conductive bars for each phase of the power supply and for the neutral. In the example of a three-phase network, this horizontal busbar comprises four bars with a rectangular section, among which three bars convey the phases of the grid and one bar is connected to the neutral of the grid. The bars of the busbar J1 extend parallel to the ground in the configuration installed inside the electric panel 1.

The horizontal busbar J1 is electrically connected to two vertical busbars J2, which extend in the direction of the height of the electric panel 1. In practice, several connecting pieces make it possible to electrically connect the bars from the busbar J1 with the bars from the busbars J2.

The busbars J2 each comprise four conductive bars B with a rectangular section, which extend in a same vertical plane P2. The plane P2 is parallel to the longitudinal direction of the bars of the horizontal busbar J1.

The bars B of each vertical busbar J2 are housed inside a column 6 that protects the busbar from the outside, in particular from dust and other particles. This column 6 also keeps the bars in position and electrically insulates the bars of the busbar J2 relative to one another. In FIGS. 3 to 5, only three bars B out of four are shown for clarity of the drawing. In practice, the fourth bar B, which is not shown, is received in the column 6 in a vertical housing visible on the left of the bars B in FIGS. 2 and 3 and which extends over the entire height of the column 6.

Reference d2 designates the separation of the bars B, i.e., the distance between two successive bars. In the example, d2 is approximately equal to 18 mm.

The electric panel 1 is said to have detachable racks, i.e., it comprises several racks T2 that may be selectively connected to the sets of distribution bars J2 by plugging.

In the rest of the description, only one column 6 protecting a vertical busbar J2 is described, inasmuch as the other column is identical. This column constitutes a positioning assembly 6 for racks T2, which are provided to be connected to the vertical busbar J2 contained in the assembly 6. These racks T2 can alternatively be plugged in or detached with respect to the assembly 6. The racks T2 can each be considered to be switches positioned between the power supply source, here the busbar J2, and an electric appliance, such as an electric motor. The switch is closed simply by plugging in the rack under the assembly 6, optionally with additional security.

The racks T2 have different heights, in particular with a height that is a multiple of 50 mm. Reference is made to a positioning pitch of the racks. Thus, the electric panel 1 may comprise racks of 100 mm, 150 mm or even 200 mm, up to 600 mm in 50 mm pitches. In practice, the height of a rack is chosen as a function of the power or type of electric appliance to be connected.

Compared to the current electric panels where the pitch is 100 mm, the electric panel 1 according to the invention makes it possible to plug in more racks if the conditions allow it, and therefore to connect more electric appliances to a same panel. In other words, the rack density within the electric panel 1 according to the invention is greater than the rack density in an electric panel of the prior art.

Each rack comprises electric connection means for connecting to the bars of the busbar J2 and an output terminal block, on which it is possible to connect the electric appliance. In practice, the electric connection means connecting the racks to the bars of a vertical busbar are formed by two-finger clamps, which are provided to clamp the bars B. Thus, each rack may comprise three or four connecting clamps to the bars B depending on whether the bar set has three or four poles, those clamps not being shown in the figures.

In the rest of the description, the terms "upper", "lower", "top" and "bottom" must be interpreted relative to an installed configuration of the positioning assembly 6 in the electric panel 1, as illustrated in FIG. 1.

The positioning assembly 6 comprises several modules 20, which are stacked above one another in the direction of the height. In other words, the modules 20 bear on one another. The modules 20 are each made from an electrically insulating material, preferably a plastic material.

The modules 20 each have a height h20 of 50 mm, such that it is possible to plug a rack in on the electric panel 1 every 50 mm. For example, a 150 mm rack occupies three positioning modules 20.

The modules 20 of the assembly 6 are contained in a sheet metal enclosure 8 having a U-shaped horizontal section with a flat bottom, the bottom of the U being oriented toward the bottom of the cabinet. Here, the bottom of the cabinet represents the vertical wall of the electric panel 1 opposite the racks T2. Thus, the racks T2 close toward the bottom of the cabinet. References 8a and 8b respectively designate the lower and upper ends of the enclosure 8. The modules 20 for positioning the racks T2 are positioned above one another between a lower stopper that is not shown in FIG. 2 and an upper stopper. References 20a and 20b respectively designate a lower module and an upper module, i.e., modules that are positioned at the very bottom and very top of the assembly 6 in the configuration installed in the electric panel 1. The modules 20a and 20b are respectively positioned above and below the lower and upper stoppers. The stoppers of the assembly 6 are also made from an electrically insulating material, preferably a plastic material.

Furthermore, the positioning modules 20 are each fastened to the metal enclosure 8 via attaching means. These attaching means comprise notches 10 and 12 arranged in the enclosure 8 and side fins supported by the modules 20, which are provided to be engaged in the notches 10 and 12.

Furthermore, two stiffening belts 16, positioned in the upper and lower parts of the assembly 6, make it possible to reinforce the mechanical strength of the positioning assembly 6.

In the rest of the description, only one positioning module 20 is described, the others being identical. Furthermore, the "front" direction is the direction oriented toward the operator when accessing the electric cabinet, while the "rear" direction is the direction oriented toward the back of the cabinet which is the wall opposite the operator when he accesses the cabinet from the front. Likewise, a "longitudinal" direction is a horizontal direction parallel to the plane P2 and a "transverse" direction is a direction substantially perpendicular to the plane P2.

As shown in FIG. 3, the positioning module 20 comprises a front part 22, a rear part 24 and a closing member 26.

The closing member 26 is placed in the foreground in front of the positioning module 20, i.e., it is fitted on the front of the front part 22. Placing the closing member 26 in the foreground at the front allows easy and quick replacement thereof, if necessary. The front 22 and rear 24 parts are positioned on either side of the bars B of the vertical busbar J2, on either side of the plane P2.

The closing member 26 is longitudinally movable between a closed, or locked, configuration, in which access to the bars B of the vertical busbar J2 is blocked, and an open, or unlocked, configuration, in which the bars B of the vertical busbar 52 are accessible for an electric connection with the clamps of a rack. In practice, the closing member is locked when there is no rack plugged into the module 20 and enters the unlocked configuration when a rack is plugged into the module 20. In FIG. 3, the closing member 26 is in the locked configuration.

The closing member 26 is a grate that extends longitudinally in a plane P26 parallel to the plane P2. This closing member 26 comprises several openings 260 that are separated from each other by bars 262. The openings 260 and the bars 262 have globally the same width, that width being measured longitudinally. More specifically, the closing member 26 comprises eight openings 260, separated by seven bars 262. The eight openings 260 form four successive pairs of openings. The two openings of each pair are passage openings for the two fingers of a clamp of a rack. The four pairs of openings therefore correspond to the openings necessary to connect the rack to the three phases of the grid, plus the neutral.

Furthermore, an end bar 264 is positioned on the right side when the positioning module 20 is viewed from the front. This end bar 264 is a blocking, or locking, bar with respect to the movement of the closing member 26.

The blocking bar 264 is slotted, i.e., it comprises two parts 264a and 264b, which are separated by a slot 265, positioned approximately at the middle of the bar 264 over its height. The parts 264a and 264b are elastically deformable. Furthermore, as better shown in FIGS. 10 and 11, the end bar 264 comprises a contact surface S264 with an unlocking member belonging to the rack, that unlocking member being suitable for unlocking the closing member 26. In practice, the unlocking member of the closing member 26 is a fork with two fingers, which is longer than the connecting clamps for connecting to the bars B of the vertical busbar J2.

The surface S264 is formed by the front face of the parts 264a and 264b of the end bar 264. This is a vertical surface that is inclined relative to the plane P26, by an angle A1 approximately equal to 45°. The parts 264a and 264b of the bar 264 each comprise a tongue 268 for attaching to the front part 22 of the module 20. The tongues 268 are positioned side by side, as close as possible to the slot 265, on either side thereof heightwise. As better shown in FIG. 8, the closing member 26 also comprises two pins 266, which are positioned at the end opposite the blocking bar 264. These pins 266 are housed in a longitudinal recess E266 arranged in the closing member 26 and are oriented face to face, in a vertical direction, which allows removal of the spring.

The front part 22 comprises eight openings 220 for passage of the clamps of the rack. The openings 220 are positioned in a same plane P22, which is parallel to the planes P2 and P26 and are closed off by the bars 262 of the closing member 26 in the closed configuration, which limits the risk of electrocution for the operator. This improves the electrical insulation of the vertical busbar J2 relative to the outside. Furthermore, the openings 220 are open when the closing member 26 is in the open configuration, i.e., they are each transversely aligned with an opening 260 of the closing member 26.

The front part 22 also comprises an opening 222 for passage of the unlocking member of the closing member 26. The opening 222 is positioned at a longitudinal end of the front part 22, to the right when the front part 22 is viewed from the front. The opening 222 is delimited by walls 221 and also ensures attachment of the closing member 26 to the front part 22. In fact, as shown in FIG. 11, in the locked configuration of the closing member 26, the tongues 268 of the bar 264 are attached to one edge 221 of the opening 222, which blocks the longitudinal movement of the closing member 26, relative to the front part 22, toward the left in FIGS. 10 and 11.

The front part 22 comprises flanks 224 for separating the bars of the set of vertical bars J2 from each other. There are five of these flanks 224, and they each extend toward the rear in a transverse direction, i.e., perpendicular to the plane P22. They are positioned side by side in the rear portion of the part 22. The flanks 224 are not in contact with the bars B. The flanks 224 of the module 20 delimit, over their upper edge, a slot E224 for receiving a flank 224' belonging to an identical module positioned above. These flanks 224' are shown in FIGS. 5 and 12. References 224a and 224'a denote the respective surfaces of the edge, i.e., the front edge of the flanks 224 and 224'. The front part 22 also comprises guideways 226 for guiding the translation of the closing member 26, which are distributed longitudinally within the front part 22, over a lower edge and an upper edge.

Furthermore, the front part 22 delimits a cutout 229 for passage of a flat spring 228. This flat spring 228 is mounted on the part 22, at a longitudinal end opposite the opening 222. The flat spring 228 is an elastically deformable tongue, which is in permanent contact with the pins 266 and which deforms elastically during the movement of the closing member 26. By default and elastically, the flat spring 228 keeps the closing member 26 in the closed configuration. More specifically, during unlocking, the closing member 26 moves longitudinally against the elastic load action of the flat spring 228.

The flat spring 228 makes it possible to return the closing member 26 to the closed configuration when the rack is removed, i.e., it exerts an elastic force returning the closing member to its closed configuration. Furthermore, in practice, the movement of the closing member 26 is blocked by the spring, which abuts on the side wall opposite the closing member 26.

The front part 22 comprises first ribs 50 on an upper face S1. These ribs 50 each extend longitudinally between two flanks 224, are electrically insulating and each delimit a housing 52 for receiving a bar B of the vertical busbar J2 on one side. The ribs 50 are not rectilinear, i.e., they have a broken line shape, or "baffle" shape. Indeed, the ribs 50 each comprise a central portion 50c, which forms the bottom of the housing 52, two transverse portions 50b that run along the bar B on each side of the central portion 50c and two portions 50a, which longitudinally connect the portions 50b to the flanks 224. In the assembled configuration of the bars B in the assembly 6, the bars are in contact with the portions 50b and 50c of the ribs 50.

The first ribs 50 and the flanks 224 for separating the bars protrude upward relative to the upper face S1, by a height of approximately 1 cm.

The rear part 24, more particularly visible in FIG. 6, primarily makes it possible to insulate the bars of the vertical busbar J2 relative to the bottom of the metal enclosure 8. It delimits four housings 240 for receiving the bars B of the vertical busbar J2. A single housing 240 is designated in FIGS. 3 and 5, since the others are hidden by the bars B. The housings 240, which are all visible in FIG. 6, are recesses with a globally rectangular horizontal section, which extend vertically and which are each suitable for jamming one side of a bar B, i.e., the side opposite that engaged in a housing 52 of a rib 50.

The bottoms of the housings 240 are contained in a vertical plane P24, which is parallel to the plane P2. The part 24 also comprises notches 242 for jamming the flanks 224 of the front part 22.

The rear part 24 comprises, on an upper face S2, second ribs 60 suitable for insulating the bars of the vertical busbar J2 relative to the rear wall of the conductive enclosure 8.

These ribs 60 are U-shaped with a flat bottom, with the two branches of the U being parallel and oriented toward the front part 22.

Lastly, the rear part 24 comprises a lower face S4 on which third ribs 62 are positioned. These third ribs 62 are baffles that insulate the bars of the vertical busbar J2 from one another, at the interface with an identical module positioned below. As for the front part 22, these third ribs 62 are not rectilinear, i.e., they assume the form of a broken line. Relative to the ribs 50, the ribs 62 comprise an additional rectilinear portion, which extends toward the rear and defines, with the flank 224', a jamming area for the flank 224 of the lower module.

As shown in FIGS. 2, 4 and 5, the modules 20 are suitable for being nested in one another. In fact, the front part 22 comprises an upper face S1 and a lower face S3 that are complementary to one another. Likewise, the rear part 24 comprises an upper face S2 and a lower face S4 that are complementary to one another. Thus, during the fitting of one module 20 above another, the top module is comparable to a male part, while the module positioned below is a female part.

Furthermore, the part 22 of each module defines, on its lower face S3, areas 54 for receiving the first ribs 50 supported by an identical module positioned below. These areas 54 are provided between the module and the bars B of the vertical busbar J2 in the assembled configuration of the assembly 6.

Likewise, the third ribs 62 of the rear part 24 are configured to be housed in front of the ribs 60 supported by a module situated above. In other words, the rear part 24 of each module 20 delimits, at its upper surface S2, areas E60 for receiving the ribs 62 of a module situated above. These areas E60 are positioned between the ribs 60 and the bars B of the busbar J2 in the assembled configuration of the assembly 6.

The modules bear on one another, such that there is no empty space left at the interface between two modules 20 that are adjacent heightwise. The positioning modules 20 are therefore positioned, partially overlapping, above one another, which corresponds to a "tile", or overlapping, effect. This improves the insulation between the conductors of the assembly 6.

Furthermore, the immobilization of the front part 22 relative to the rear part 24 is done using the enclosure 8, by engaging the fins of the parts 22 and 24 in the notches 12 and 10, respectively, of the enclosure 8.

During operation, i.e., in the assembled state of the positioning assembly 6 and when the electric panel 1 is in use, the current flowing in the bars B of the busbar J2 tends to flow from one bar to another. To that end, the current seeks the shortest path, or the "easiest" path. Here, the bars are separated from each other by air and by the flanks 224. Since the plastic material making up the modules 20 is a better insulator than the air, the current seeks to pass through the surface of the modules 20, "licking" the walls, to rejoin the adjacent bars. It is therefore appropriate to have a sufficient insulation distance or capacity, at the walls, to avoid the creation of an electric arc. The insulation distance from which there is no electric arc formation depends on the power supply voltage of the vertical busbar J2. Beyond that distance, the priming of the electric arc cannot occur.

The insulation between the bars of the busbar J2 is in particular delicate at the interface between two successive positioning modules.

More specifically and as shown in FIG. 12, at the interface between two modules, the ribs 50 of the lower module and the flanks 224 of the two modules form a continuous barrier between the bars at the front part 22. Here, this barrier is defined between a starting point A, situated on a bar B1, and the arrival point C, situated on an adjacent bar B2. The points A and C are positioned in the same horizontal plane at the junction between the portions 50b and 50c of the ribs 50. With this example, for an electric arc to be created between two successive bars, the current must first follow the portion 50b of a rib 50 to rejoin a flank 224 in which the flank 224' of the upper module is nested. Next, the current must run along the surface of the flank 224 toward the front, until it reaches the edge of the flank 224, i.e., its front vertical edge. The current must subsequently travel along the surfaces 224a and 224'a of the edge of the flanks 224 and 224', then run along the wall 224 toward the rear. Lastly, the current must rejoin the bar B2 by using the portion 50b of the rib 50 positioned on the other side of the flanks 224 and 224'.

In all, the current must travel a distance of 25.4 mm to go from one part to the other. This distance is an insulation distance between the bars, and the path to be traveled for the current in order to go from one part to the other is a "creep", or leak, path. In practice, the longer this path is, the lower the risk of the current "creeping" from one part to another is. The insulation distance between the bars, which is 24.5 mm, is larger than the geometric separation d2 between two successive bars. The distance of 25.4 mm corresponds to the insulation distance of the American UL standard. Here, the insulation distance is great enough to avoid a short circuit between the bars. Thus, the insulation ribs 50 and flanks 224 and 224' make it possible to increase the insulation distance between the bars B without changing the separation of the bars. The flanks 224 and 224' therefore form, with the ribs 50, means for increasing the insulation distance between the bars of the interface between two successive modules, at the front part of the modules 20. This insulation distance corresponds to the length of the electric creep path between the bars. In that case, it is the arrangement of the flanks 224 and 224' relative to the ribs 50 that creates the insulation distance. In FIG. 12, the creep path is shown by arrows F4, for a current seeking to flow between the bars B1 and B2.

The creep path is increased similarly at the front part 22. In that case, for an electric arc to be created at the rear part and at the interface between two successive modules, the current must run along the ribs 62 and the edge of the flanks 224 and 224'. The insulation distance is the same as for the insulation in front of the modules 20. The ribs 62 therefore form, with the flanks 224 and 224', means for increasing the insulation distance between the bars at the interface between two successive modules, at the rear part of the modules 20. In that case, it is the broken line shape of the ribs 62 that creates the insulating distance.

Furthermore, the ribs 60 also make it possible to increase the length of the electric creep path between the bars B and the metal enclosure 8, i.e., the insulating distance between the bars B and the enclosure 8. In fact, if an electric arc is created, it must bypass the ribs 60 to reach the enclosure 8. The insulation distance is such that priming of the electric arc does not occur.

Furthermore, the upper surface of the lower stopper is complementary to the lower surfaces S3 and S4 of the bottom module 20a, and the lower surface of the upper stopper is complementary to the surfaces S1 and S2 of the upper module 20b, so as to ensure good electric insulation between the bars over the entire height of the assembly 6.

When a rack is plugged into the module 20, the two fingers of the fork of the rack, i.e., the unlocking member, first come into contact with the two parts 264a and 264b of the bar 264, respectively, since the fork is longer than the electric connecting clamps. The fork then bears on the surface S264 of the two parts 264a and 264b of the bar 264 in a transverse direction F1.

This causes a slight bend, or even torsion F2 of the parts 264a and 264b of the bar 264, and the tongues 268 detach from the walls 221 of the opening 222.

Furthermore, since the rack is transversely plugged into the electric panel 1, once the tongues 268 are detached from the walls 221 of the opening 222, the closing member 26 is unlocked and is moved in the guideways 226 in a longitudinal direction. In fact, the bar 264 acts as a corner owing to its inclined surface S264 and converts the transverse force F1 applied by the rack on the surface S264 of the bar 264 into a longitudinal movement F3 of the closing member 26. The movement F3 of the closing member 26 implies that the bars 262 of the closing member 26 expose the openings 220 of the front part 22. The openings 220 and 260 are then transversely aligned, and the clamps of the rack can connect to the bars of the vertical busbar J2.

Furthermore, the closing member 26 cannot be unlocked from the front part 22 except by plugging in a rack or using a specific tool. Thus, the slots 220 for passage of the clamps cannot be opened manually by the operator, which, from a normative perspective, corresponds to a higher safety level than for a manually detachable closing member.

The positioning modules 20 of the positioning assembly 6 are assembled as follows.

The metal enclosure is placed flat, with the two side walls of the enclosure oriented vertically and the outer surface of the bottom of the enclosure 8 bearing on a planar surface. The rear part 24 of the module 20a is fastened to the inside of the enclosure 8. This rear part 24 is positioned at the bottom of the enclosure, at the end 8a thereof. The rear parts 24 of the other modules 20 are next assembled horizontally one after the other, going from the first end 8a toward the second end 8b of the enclosure 8.

A second step consists of positioning the bars from the vertical busbar J2 horizontally in the housings 240 of the rear parts 24 of the modules 20.

A third step consists of fastening the front parts 22, each equipped with a closing member 26. Similarly to the fitting of the rear parts 24, the fitting of the front parts 22 is done horizontally going from the first end 8a to the second end 8b of the enclosure 8. Thus, the fitter begins by fastening the front part 22 of the module 20a and assembles the other front parts 22 one after the other going toward the second end 8b of the enclosure 8.

The bars B of the vertical busbar J2 are then connected between the front 22 and rear 24 parts of the modules 20.

When all of the modules 20 are assembled, the upper and lower stoppers are respectively assembled with the modules 20b and 20a, such that once the assembly 6 is placed upright, the lower and upper stoppers are respectively located below and above the modules 20a and 20b. The stiffening belts 16 are lastly attached in the upper and lower parts of the assembly 6 to ensure good mechanical strength thereof. The assembly 6 is then ready to use, i.e., it can be placed upright and installed in the electric panel 1. Assembling the positioning assembly 6 flat makes the fitting considerably easier.

The depth of the modules 20, i.e., their transverse dimension, can be adjusted over a range of 10 mm to adapt to different slenderness values of the bars. The slenderness of the bars corresponds to the transverse dimension, and the depth of the modules 20 is adjusted by bringing the front part 22 closer to or further from the rear part 24. This adjustment only causes movement of the enclosure 8.

The technical features of the embodiments and alternatives considered above may be combined to yield new embodiments of the invention.

The invention claimed is:

1. A rack positioning assembly for an electric panel, comprising:
a vertical busbar configured to distribute electric current to electric appliances, said busbar comprising several bars, which are positioned in a same vertical plane and on which are provided connections to racks of the electric panel, and
several rack positioning modules, which are positioned above one another, which surround the bars of the vertical busbar and which comprise separating flanks for the bars of the vertical busbar between which insulating ribs extend, wherein each insulating rib extends between two flanks and is not rectilinear, the separating flanks for the bars of the vertical busbar between which insulating ribs extend increasing an insulation distance between the bars at an interface between two successive modules, the insulation distance corresponding to a length of an electric creep path between the bars,
wherein the flanks are not designed to be in contact with the bars.

2. The rack positioning assembly according to claim 1, wherein each insulating rib is in the form of a broken line.

3. The rack positioning assembly according to claim 1, wherein the insulation distance is equal to 25.4 mm.

4. The rack positioning assembly according to claim 1, wherein each positioning module comprises:
a first part, in which passage openings are arranged for electric connectors connecting a rack to the bars of the vertical busbar,
a second part, positioned behind the first part, and
a closing member, which is movable relative to the first part between a closed configuration in which the openings are closed off and an open configuration in which the openings are exposed.

5. The rack positioning assembly according to claim 4, wherein the closing member is a grate, which is horizontally movable relative to the first part, in a direction parallel to the vertical positioning plane of the bars of the vertical busbar and which is positioned in the foreground of the modules, and
wherein the grate comprises several openings and several bars, among which an end part is attachable to the first part when the closing member is in the closed configuration.

6. The rack positioning assembly according to claim 5, wherein the end part is detachable from the first part by applying a transverse force oriented globally perpendicular to the vertical plane in which the bars of the vertical busbar are placed,
wherein the end bar comprises a contact surface that is inclined relative to that plane, and
wherein the force applied to detach the bar also causes a longitudinal movement of the grate relative to the first part.

7. The rack positioning assembly according to claim 4, wherein each module comprises a return device configured to return the closing member to the closed configuration.

8. The rack positioning assembly according to claim 7, wherein the return device comprises a flat spring attached to the first part, which exerts an elastic load force returning the closing member to its closed configuration.

9. An electric panel, comprising a cabinet, in which a horizontal power supply busbar is positioned provided to be connected to a vertical distributor busbar, said panel comprising a rack positioning assembly according to claim 1.

10. The rack positioning assembly according to claim 1, wherein at least one of the insulating ribs delimits a housing for receiving a bar of the vertical busbar.

11. The rack positioning assembly according to claim 1, wherein at least one of the insulating ribs is U-shaped.

12. A method for assembling a rack positioning assembly including a vertical busbar configured to distribute electric current to electric appliances, said busbar comprising several bars, which are positioned in a same vertical plane and on which are provided connections to racks of the electric panel, and several rack positioning modules, which are positioned above one another, which surround the bars of the vertical busbar and which comprise separating flanks for the bars of the vertical busbar between which insulating ribs extend, the separating flanks for the bars of the vertical busbar between which insulating ribs extend increasing an insulation distance between the bars at an interface between two successive modules, the insulation distance corresponding to a length of an electric creep path between the bars, wherein each positioning module includes a first part, in which passage openings are arranged for electric connectors connecting a rack to the bars of the vertical busbar, a second part, positioned behind the first part, and a closing member, which is movable relative to the first part between a closed configuration in which the openings are closed off and an open configuration in which the openings are exposed, the method comprising:
a) placing a metal enclosure with a U-shaped cross-section flat, with two side walls of the metal enclosure oriented vertically and an outer surface of a bottom of the metal enclosure in contact with a planar surface;
b) fastening a second part of a first module to an inside of the metal enclosure, at a first end of the metal enclosure;
c) assembling second parts of other modules one after another going from the first end of the metal enclosure to a second end of the metal enclosure, the first and second ends of the metal enclosure respectively being lower and upper ends of the metal enclosure in an assembled configuration of the assembly in the electric panel;
d) positioning bars of the vertical busbar in housings of the second parts of each of the first and other modules;
e) fastening the first part of the first module to the a top of the bars of the vertical busbar; and
f) assembling first parts of the other modules one after another going from the first end of the metal enclosure to the second end of the metal enclosure.

* * * * *